INVENTORS
GUY NOREL
ROBERT DESBRANDES

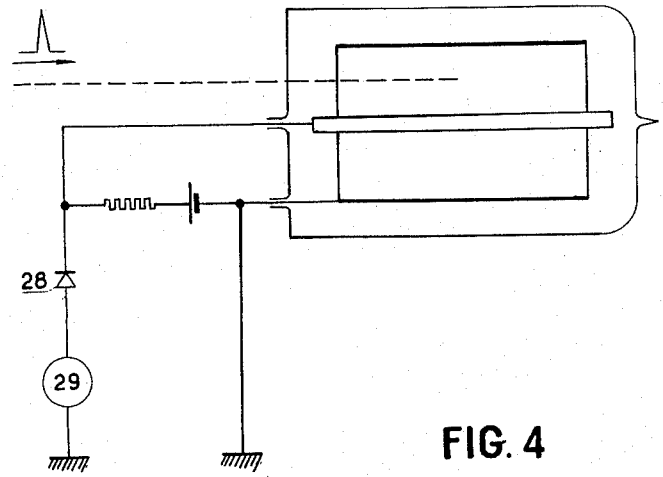
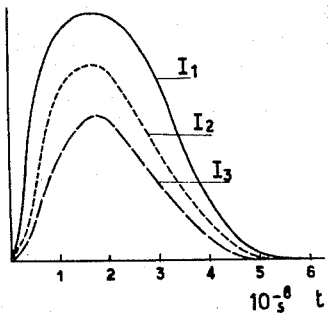
FIG. 5
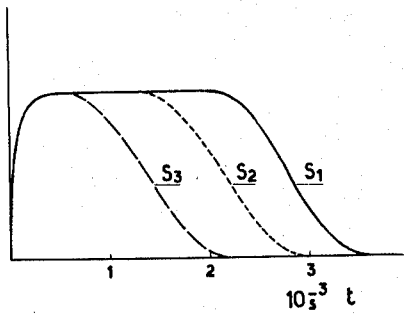
FIG. 5a
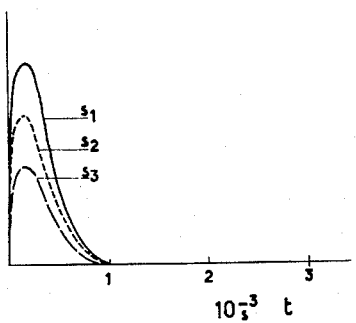
FIG. 5b

March 9, 1965 G. NOREL ETAL 3,173,090
SHORT DURATION PULSE ENERGY MEASURING DEVICE USING
A GAS TUBE WHOSE DEGREE OF IONIZATION
IS VARIED BY THE PULSE ITSELF
Filed Nov. 17, 1960 4 Sheets-Sheet 4

INVENTORS
GUY NOREL
ROBERT DESBRANDES

BY *Toulmin & Toulmin*

ATTORNEYS

United States Patent Office 3,173,090
Patented Mar. 9, 1965

3,173,090
SHORT DURATION PULSE ENERGY MEASURING DEVICE USING A GAS TUBE WHOSE DEGREE OF IONIZATION IS VARIED BY THE PULSE ITSELF
Guy Norel, Rueil-Malmaison, and Robert Desbrandes, Montesson, France, assignors to Institut Francais du Petrole, des Carburants et Lubrifiants, Paris, France
Filed Nov. 17, 1960, Ser. No. 69,978
Claims priority, application France, Sept. 8, 1960, 838,275
4 Claims. (Cl. 324—102)

The present invention relates to the measurement of the energy of pulses, more particularly to an apparatus and method for measuring the energy of pulses of short duration and having different shapes by transforming the pulses into rectangular waves whose length is proportional to the energy level of the pulses.

Previously, the energy level of short pulses could not be measured directly. However, since the peak voltage of the pulses was susceptible to measurement, an indication of the energy level could be obtained. This was not a major drawback when successive pulses of the same shape and generated by the same apparatus were to be measured. In this instance the level of energy of each pulse is proportional to its peak voltage and the measurement of the variations of the peak voltage is equivalent to that of the variations of the energy level from one pulse to the other.

Further, the known processes for measuring the peak voltage of the pulses are not of general applicability and require the use of very complicated forms of apparatus.

One of the most common forms of apparatus for measuring the peak voltage of pulses comprises essentially a system of trigger circuits each of which is triggered only by voltages higher than that of the threshold or triggering value. Such trigger circuits comprise either triodes or thyratrons. When the pulses to be measured are of very short duration, trigger circuits using triodes are necessary since the energy level of such pulses is generally insufficient for ionizing a thyratron.

The peak voltage of the pulses is determined approximately by actuation of the trigger circuit whose ionizing threshold is lower than the peak voltage of the pulse to be measured, and by the non-actuation of the other trigger circuits. As a result it is seen that the peak voltage of the pulse has a value between the higher ionizing threshold of the actuated trigger circuits and the lower ionizing threshold of the non-actuated trigger circuits. However, this only establishes a range of possible values but does not provide for an accurate measurement of the peak voltage of the pulse. In actual practice this range cannot be reduced since it would require the use of numerous trigger circuits in order to reduce sufficiently the difference between two successive threshold values of the trigger circuits.

Such a system of trigger circuits, adjusted to different threshold values, is of particular interest for measuring statistically the peak voltage values in a series of successive pulses occurring at variable intervals. However, in the case of pulses which occur at constant intervals of time and where it is desired to know at any moment the peak voltage or the energy of the pulses, such a system of trigger circuits is either of a very complex utilization or cannot be used at all. This is particularly true when the pulse whose peak voltage is to be measured immediately follows another pulse of a higher peak voltage.

The above described disadvantages are overcome by this invention by transforming the pulses to be measured to rectangular waves, the lengths of which are proportionate to the energy level of the corresponding pulses.

The method of this invention is carried out by means of a rare gas-filled vacuum tube which comprises a central electrode and having at least one peripheral electrode of the type described hereafter.

It has been discovered that when the pulses are applied to the central electrode of an ionized rare gas-filled vacuum tube as hereafter described, each pulse creates an electromagnetic field which considerably increases the conductivity of the rare gas of the vacuum tube. By means of a suitable selection of the type of rare gas used and of the pressure of the latter, it is possible to maintain the increase in conductivity, due to said electromagnetic field occurring when the pulse passes through the central electrode, over a period of time, which is proportionate to the energy level of the pulse. Further, this conductivity is of a duration very considerably greater than the duration of the pulse itself since it corresponds in most cases to from 100 to 100,000 times the duration of the pulse.

It will then be sufficient to provide a potential difference between the central electrode and the peripheral electrode which will ionize the gas of the tube. Accordingly, the increase in the conductivity due to the application of the pulse to the central electrode can be measured either by the voltage drop appearing at that electrode having the higher potential by the voltage increase appearing at the electrode having the lower potential.

It is therefore the principal object of this invention to provide a process for measuring with a high accuracy, the energy level and/or the peak voltage of pulses.

It is another object of this invention to provide a simple apparatus for measuring continuously the energy level and/or the peak voltage of pulses.

It is an additional object of this invention to provide a device for measuring the energy level and/or the peak voltage of pulses of very short duration.

It is a further object of this invention to provide a device by which the energy level and/or the peak voltage of pulses immediately following other pulses of higher peak voltage can be measured.

It is still a further object of this invention to provide a device for measuring the energy level of pulses of different shapes, which results in the possibility of comparing said pulses to each other.

This invention will be further explained and other objects and advantages will be apparent with reference to the accompanying description and following drawings wherein:

FIGURE 1 shows a schematic arrangement of an electrical circuit comprising a rare gas-filled vacuum tube and wave forms illustrating its operation;

FIGURE 2 diagrammatically shows, more in detail, the typical form of the wave obtained by use of the electrical device according to this invention;

FIGURE 4 illustrates the use of a measuring device in association with the electrical arrangement of FIGURE 1 as applied to the detection and measurement of external electromagnetic waves;

FIGURE 5 shows a series of pulses having the same length but different amplitudes;

FIGURE 5a shows the typical response-waves obtained by conversion of pulses of FIGURE 5 under optimum conditions;

FIGURE 5b shows the typical response-waves obtained by conversion of pulses of FIGURE 5 under non-optimum conditions;

The specific embodiment of the electrical device for carrying out the method according to this invention and its operation will be explained more in detail with reference to the drawings.

Figure 1:
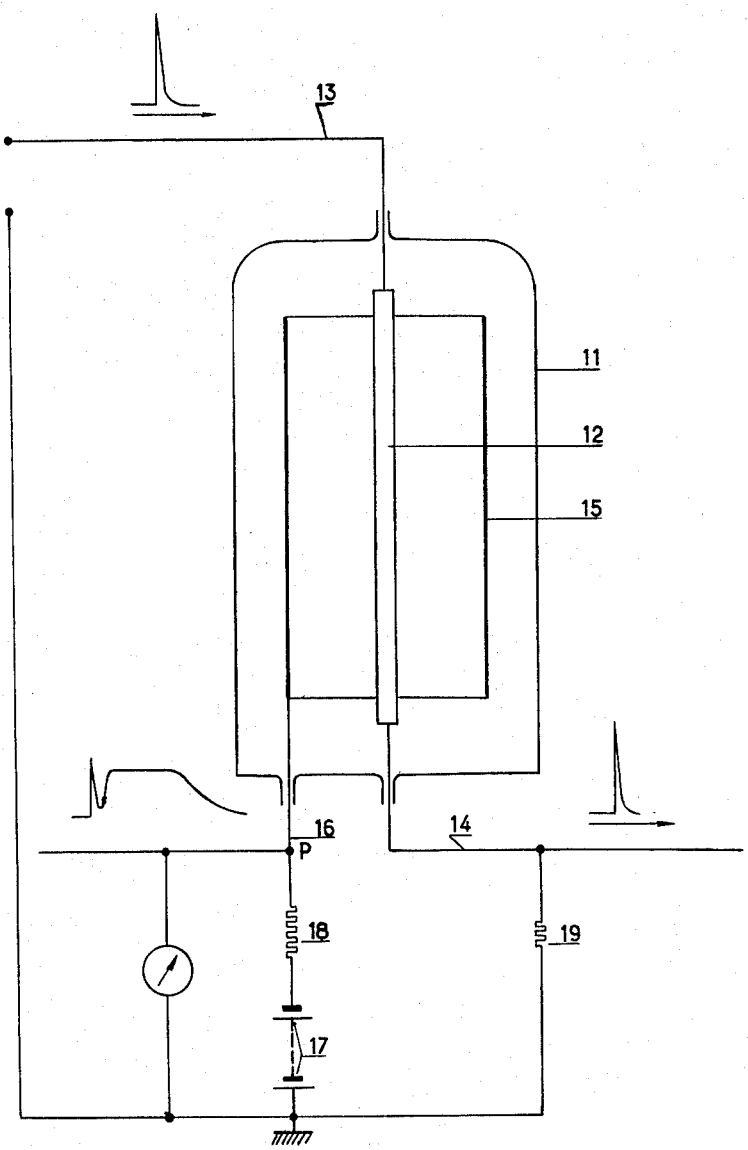

With particular reference to FIGURE 1, the pulses are applied between a lead 13 connected to one end of a central electrode 12 provided throughout a gas-filled vacuum tube 11 and a point at a reference potential, which, on FIGURE 1, is the potential of the earth. The other end of said central electrode is connected to a wire 14 leading outside of the gas-tube. The central electrode 12 is surrounded with a co-axial peripheral electrode 15 of cylindrical shape, which is connected to a source of current 17 through a lead 16 and a limiting resistor 18. The resulting voltage applied to electrode 15 is higher than the firing voltage of the tube. The central electrode 12 is grounded through load resistor 19.

The pulse to be measured is applied between the lead 13 and said point at a reference potential and passes through the central electrode 12 of the gas-filled tube. This causes a change in conductivity of said gas, which results in an increase in potential at point P, when the peripheral electrode is negatively charged.

The higher potential due to the higher conductivity of the gas of the tube is maintained over a period of time whose length depends on the deionization delay of the gas used in the tube and is proportionate to the energy level of the pulse.

There is thus obtained between point P and said point at a reference potential a substantially rectangular response-wave, the width of which is representative of the energy level of the pulse. This response wave may be measured by means of any convenient measuring apparatus such as a cathodic oscillograph of the type used with alternating current, a galvanometer connected to a condenser or to a rectifying device, such as a rectifying tube or a diode, or any other conventional device for measuring voltage variations.

Figure 2:
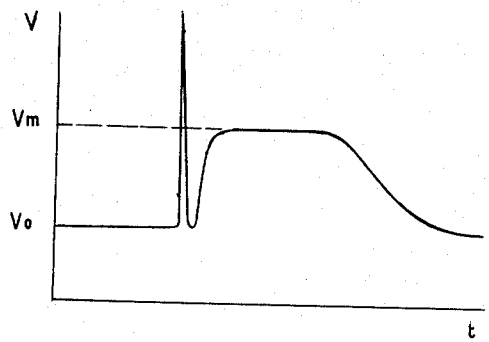

The rectangular wave obtained is always preceded by a pulse resulting from the capacitive effect between the central and the peripheral electrodes as shown by FIGURE 2. The peak voltage of this pulse is in most cases higher than the voltage of the rectangular wave. If it is desired to reduce the relative importance of this pulse as compared to that of the rectangular wave, it may be of advantage to use a tube of the type shown in FIGURE 3. Such a tube comprises two central electrodes 22 and 23, the first of which, acting as receiving electrode is connected to an external lead 24 for receiving the pulses which are applied between said lead 24 and a point at a reference potential (the earth on FIGURE 3). The potential difference is then applied between the second of said central electrodes 23, which only receives attenuated pulses by capacitive effect, and a peripheral electrode 25.

This potential difference is obtained by connecting electrode 25 to one terminal of the current source 27 and electrode 23 to the other terminal of said current source, through a circuit comprising a resistor 26.

The response wave is obtained between a point Q and said point at a reference potential in the form of a rectangular wave of positive voltage since the potential of electrode 23 increases when the gas-filled tube conducts.

FIGURE 4 is analogous to FIGURE 1. However, the electromagnetic field that causes the variation in the conductivity of the rare gas of the vacuum tube is directly propagated from the exterior instead of being created in the interior of the vacuum tube by the passage of an electrical impulse through the central electrode. It is possible that a sufficiently strong electromagnetic field, such as, for instance, those produced by Hertzian beams utilized for telecommunications, or by radar beams, can act directly from the exterior on the conductivity of the rare gas of the vacuum tube. This provides a very simple and efficient detection and measuring means of these electromagnetic waves.

It is not necessary that the vacuum tube comprise a central electrode when exterior electromagnetic waves are used. It is sufficient to provide in the interior of the vacuum tube two electrodes of any kind between which a difference in the potential is created. The electrodes can be positioned in the tube as desired.

FIGURE 4 further illustrates, in association with a rare gas-filled vacuum tube, the utilization of a measuring device comprising a diode 28 and a galvanometer 29, which indicates the intensity of the current passing through the diode, which intensity is representative of the response signal of the vacuum tube.

Figure 3:
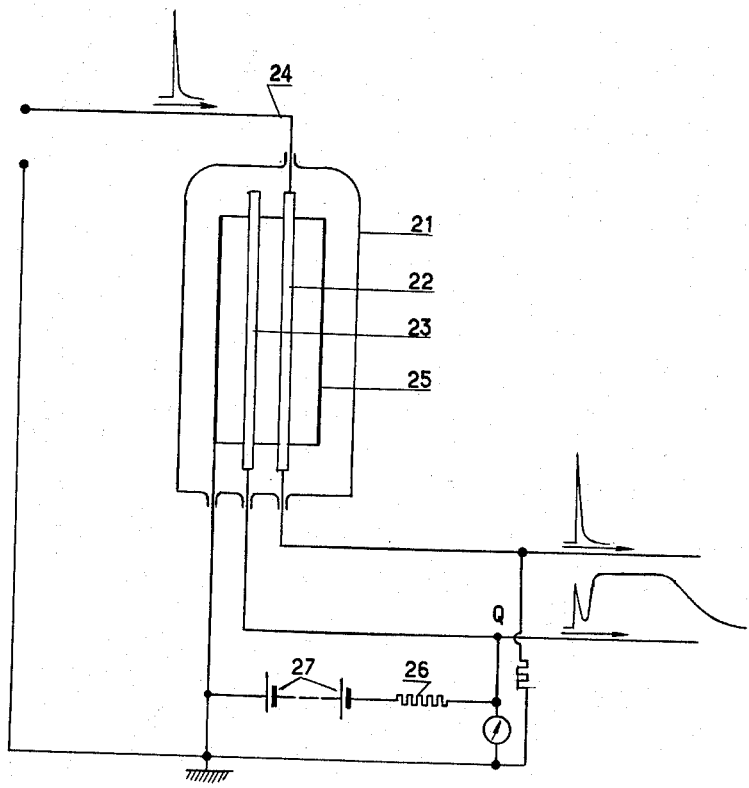
FIGURE 3 illustrates another schematic electrical arrangement comprising a rare gas-filled tube having two central electrodes.

Although the peripheral electrodes shown in FIGURES 1, 3 and 4 are of the cylindrical type, electrodes of any other shape may as well be used satisfactorily. The gas tube may for instance be provided with one or more peripheral electrodes in the form of plates, tube portions, or spherical calottes, since the shape of the electrode does not bring about any significant change in the result obtained.

In most cases, however, it is simpler to use central electrodes in the form of metal rods or ribbons, preferably placed along the axis of symmetry of the tube in the case where only one central electrode is used, and a peripheral electrode in the form of a cylinder co-axially disposed with regard to the central electrode. As an alternative there can be used a plate, or a plurality of peripheral electrodes consisting of plates which are preferably disposed at equal distances from the central electrode. In the latter case the different peripheral electrodes will be electrically connected to each other and to a source of current or to ground according to the potential desired on the electrode.

The electrodes may be made of any metal which will not significantly absorb the rare gas of the tube and which is not susceptible to substantial volatilization under the reduced pressures prevailing in the tube. Such metals may be nickel, aluminum or molybdenum.

Figure 7:
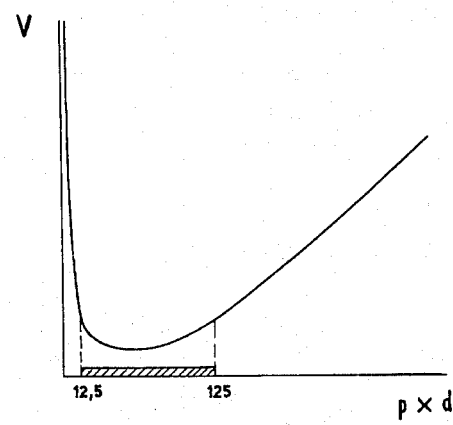
FIGURE 7 shows the curve of Paschen and that zone corresponding to the minimum of the curve.

The gases which may be employed for filling the tube are the rare gases such as helium, neon, argon, krypton and xenon. The pressure of the gas in the valve will be adjusted with consideration to the distance between the central and the peripheral electrodes, preferably so that the product of said pressure $p$, expressed in millimeters of mercury, multiplied by the distance $d$ between the anode and the cathode, expressed in millimeters, be comprised within the range of from 12.5 to 125, which range corresponds substantially to the region of the minimum of the curve of Paschen as shown in FIGURE 7. This curve represents the triggering voltage of the gas-filled tube plotted against said last mentioned product of the gas pressure by the distance separating the peripheral electrode from the central one ($p.d$).

For example, with a distance $d$ of 25 mm. between the electrodes, the pressure may be selected within the range of 0.5 to 5 millimeters of mercury or, with a distance $d$ of 12.5 millimeters, within the range of 1 to 10 mm. of mercury. When practising the invention care should be taken to avoid the pressure range at which volatilization of the metal of the electrodes becomes substantially, by correspondingly adjusting the distance $d$ so as to comply with the optimum conditions corresponding to the region of the minimum of Paschen's curve.

It has been observed that sharper rectangular waves are obtained with gas-filled tubes fulfilling this condition. However it still remains possible to obtain the benefit to a certain extent of the advantages provided according to this invention even when the aforesaid optimum conditions are not fulfilled.

FIGURE 5 shows a series of pulses having the same duration (of about 0.06 microsecond) and variable amplitudes (pulses referenced $I_1$ $I_2$ and $I_3$). The corresponding response-waves obtained according to this invention are of the type shown in FIGURE 5a, ($S_1$, $S_2$ and $S_3$) when using a gas-filled tube complying with the requirements for optimum conditions (corresponding to the region of the minimum of the Paschen's curve).

The rectangular response-waves having a duration of a few thousandths of a second are consequently very easily measurable with accuracy.

FIGURE 5b shows the response-waves obtained when practising the invention under non-optimum conditions, i.e. when the product p.d as hereabove defined is not selected within the range of values corresponding to the minimum of the Paschen's curve. The response waves s1, s2 and s3 are of relatively shorter duration and of variable peak voltage, which makes their measurement more difficult. However, these response-waves still have a duration of the order of a few hundredths of a microsecond so that the method of this invention has major advantages.

Figure 6:
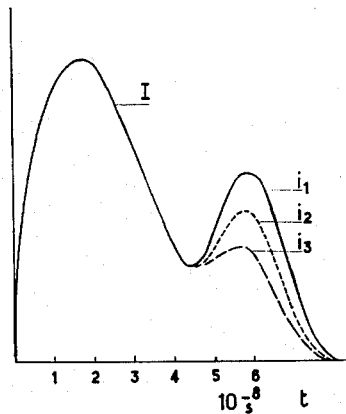
FIGURE 6 shows a series of pairs of associated pulses having the same length, the first pulse of each pair being constant in shape and magnitude and the second pulse being of variable amplitude.

FIGURE 6 illustrates a pulse with variable peak voltages ($i_1$, $i_2$, $i_3$) immediately preceded by a stronger pulse of constant shape and amplitude, these two consecutive pulses renewing themselves periodically.

Figure 6A:
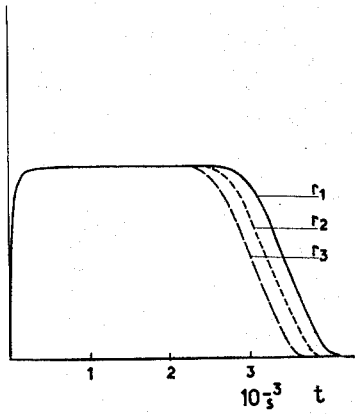
FIGURE 6a shows the typical response-waves obtained by conversion of pulses of FIGURE 6 according to this invention.

The conventional processes for measuring the peak voltage of pulses are not suitable for detecting the amplitude changes of the i pulses of FIGURE 6 since only the first pulse I of each pair triggers the ionization. On the contrary it is possible, according to the invention to measure with accuracy the amplitude changes of said pulses i as shown in FIGURE 6a wherein the response-waves $r_1$, $r_2$, $r_3$, corresponding to the respective pair of pulses $I+i_1$, $I+i_2$, $I+i_3$, are easily measurable and show the variations in the energy level of the i pulses.

It must be noted that the response-waves obtained according to this invention are not substantially changed by the noise of the gas-filled tube, the level of which, for tubes fulfilling the above-mentioned conditions, is not in excess of a few millivolts as compared to response waves of several volts.

It is understood that this invention is susceptible to modifications in order to adapt it to different usages and conditions and, accordingly, it is desired to comprehend such modifications within this invention as may fall within the scope of the appended claims.

What we claim is:

1. Short duration pulse energy measuring device, comprising a rare gas-filled vacuum tube, said tube having therein at least one linear central electrode protruding from the tube at both ends and at least one surrounding peripheral electrode, means for applying the input signal across the ends of the central electrode, a D.C. current source providing a potential difference for permanently ionizing the gas and limiting resistor means connected between the surrounding peripheral electrode and the central electrode, and means connected across the said limiting resistor means for measuring the corresponding output signal.

2. Short duration pulse energy measuring device, comprising a rare gas-filled vacuum tube having at least one linear central electrode protruding from the tube at both ends and one surrounding peripheral electrode substantially parallel thereto, means for energizing a pair of said electrodes, consisting of said peripheral electrode and one central electrode with a potential difference of sufficient value for permanently ionizing said gas, whereby said tube exhibits a positive resistance characteristic, said means comprising a source of current having a first terminal connected through a limiting resistor to said peripheral electrode, and a second terminal connected through a load resistor to the said central electrode at one end thereof, means for applying the input pulse signal across said load resistor by making input connections to the opposite end of said central electrode and to said second terminal of said current source, and means for measuring the corresponding output signal between said second terminal of said current source and said peripheral electrode.

3. Short duration pulse energy measuring device, comprising a rare gas-filled vacuum tube having at least two linear central electrodes and a surrounding peripheral electrode, one of the two central electrodes protruding from the tube at both ends and the other protruding only at one end, means for energizing said peripheral electrode and the other central electrode, with a potential difference of sufficient value for permanently ionizing said gas, whereby said tube exhibits a positive resistance characteristic, said means comprising a source of current and a pair of conductors connecting the terminals thereof to said peripheral electrode and to said other central electrode respectively, a first one of said conductors including a limiting resistor, a load resistor connected between the peripheral electrode and a protruding end of said one central electrode, means for applying the input pulse signal across said load resistor by making input connections to the opposite protruding end of the said one central electrode and to the peripheral electrode, and means for measuring the corresponding output signal across the limiting resistor and the source of current.

4. The invention as defined in claim 2 wherein the distance between the pair of said electrodes is such that the product of its value expressed in millimeters with the pressure of the gas in the tube expressed in millimeters of mercury, ranges between 12.5 and 125.

References Cited in the file of this patent

UNITED STATES PATENTS

| | | |
|---|---|---|
| 1,645,057 | Junken | Oct. 11, 1927 |
| 1,967,008 | Hund | July 17, 1934 |
| 2,326,677 | Perelman | Aug. 10, 1943 |
| 2,440,547 | Jensen | Apr. 27, 1948 |
| 2,669,609 | Linder | Feb. 16, 1954 |
| 2,671,170 | Douvas | Mar. 2, 1954 |